(12) United States Patent
Bommareddy et al.

(10) Patent No.: US 8,425,636 B2
(45) Date of Patent: Apr. 23, 2013

(54) GASIFICATION PLANT WITH TOTAL ZERO DISCHARGE OF PLANT PROCESS WATERS

(75) Inventors: Sampath K. Bommareddy, Houston, TX (US); Dinh-Cuong Vuong, Houston, TX (US); James Scott Kain, Houston, TX (US); Anil Dhansukh Amlani, Houston, TX (US); Robert Henry Weed, North Wales, PA (US)

(73) Assignee: General Electric Company, Schenectady, NY (US)

( * ) Notice: Subject to any disclaimer, the term of this patent is extended or adjusted under 35 U.S.C. 154(b) by 771 days.

(21) Appl. No.: 12/617,621

(22) Filed: Nov. 12, 2009

(65) Prior Publication Data
US 2011/0108405 A1   May 12, 2011

(51) Int. Cl.
*B01J 7/00* (2006.01)
(52) U.S. Cl.
USPC ............... 48/61; 48/127.9; 48/127.1; 48/76; 48/128; 48/77; 48/202; 48/203; 48/204; 202/203; 210/652; 210/760; 210/739
(58) Field of Classification Search ........... 48/61, 127.9, 48/127.1, 76, 128; 210/652, 739, 760, 203
See application file for complete search history.

(56) References Cited

U.S. PATENT DOCUMENTS

| 4,211,540 A * | 7/1980 | Netzer ........................... 48/202 |
| 7,083,730 B2 | 8/2006 | Davis |
| 7,381,389 B2 * | 6/2008 | Harada et al. ................. 423/237 |
| 8,062,408 B2 * | 11/2011 | Chen et al. ....................... 95/163 |
| 2003/0034310 A1 * | 2/2003 | Vuong ........................... 210/724 |
| 2003/0047716 A1 * | 3/2003 | Tsang ............................. 252/373 |
| 2007/0125719 A1 | 6/2007 | Yarbrough et al. |
| 2008/0099154 A1 | 5/2008 | Minnich et al. |
| 2008/0110630 A1 | 5/2008 | Minnich et al. |
| 2009/0188867 A1 * | 7/2009 | Vuong et al. .................. 210/652 |
| 2010/0087687 A1 * | 4/2010 | Medoff .......................... 568/840 |
| 2010/0089740 A1 * | 4/2010 | Vuong et al. .................... 203/10 |
| 2010/0172819 A1 * | 7/2010 | Wallace et al. ............... 423/471 |

FOREIGN PATENT DOCUMENTS
WO       2010/014462 A1       2/2010

OTHER PUBLICATIONS

Mesaba Energy Project, Nov. 2007, http://go.energy.gov/NEPA/nepa_documents/doosideis/eis0382D/.
WO Search Report issued in connection with corresponding WO Patent Application No. US10/50452 filed on Sep. 28, 2010.

* cited by examiner

Primary Examiner — Kaity V. Handal
(74) Attorney, Agent, or Firm — Fletcher Yoder P.C.

(57) ABSTRACT

In certain embodiments, a system includes a gasification system configured to output grey water. The system also includes a grey water zero liquid discharge (ZLD) system configured to receive the grey water and to generate a first stream of distillate. The grey water ZLD system comprises an ammonia stripping system. An amount of water into and out of the grey water ZLD system is approximately equal.

19 Claims, 3 Drawing Sheets

US 8,425,636 B2

GASIFICATION PLANT WITH TOTAL ZERO DISCHARGE OF PLANT PROCESS WATERS

BACKGROUND OF THE INVENTION

The subject matter disclosed herein relates to gasification process plants for chemical production and/or integrated gasification combined cycle (IGCC) power plants. More specifically, the disclosed embodiments relate to zero liquid discharge (ZLD) process water systems associated with IGCC power plants to improve efficiency and to reduce raw water consumption.

IGCC power plants are capable of generating energy from various carbonaceous feedstock (e.g., coal, oil, or natural gas) relatively cleanly and efficiently. Gasification technology may convert the carbonaceous feedstock into a gas mixture of carbon monoxide (CO) and hydrogen ($H_2$), i.e., syngas, by reaction with oxygen and steam in a gasifier. These gases may be cleaned, processed, and utilized as fuel in the IGCC power plant. For example, the syngas may be fed into a combustor of a gas turbine of the IGCC power plant and ignited to power the gas turbine for use in the generation of electricity. However, gasification processes of the IGCC plants tend to generate substantial amounts of grey water, which must be utilized in the gasification process. A portion of grey water is disposed of external to the IGCC power plant to prevent unwanted buildup.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a gasification system with an output of grey water. The system also includes a cooling tower system configured to receive raw water and to supply the gasification system with process water. The system further includes a grey water ZLD system configured to receive the grey water from the gasification system, to generate a first stream of distillate, and to direct the first stream of distillate to the gasification system. In addition, the system includes a cooling water ZLD system configured to receive cooling tower blowdown from the cooling tower system, to generate a second stream of distillate, and to direct the second stream of distillate to the cooling tower system.

In a second embodiment, a system includes a gasification system configured to output grey water. The system also includes a grey water ZLD system configured to receive the grey water and to generate a first stream of distillate. The grey water ZLD system comprises an ammonia stripping system. An amount of water into and out of the grey water ZLD system is approximately equal.

In a third embodiment, a system includes a cooling tower. The system also includes a cooling water ZLD system having an evaporation pond. The cooling water ZLD system is configured to receive cooling tower blowdown from the cooling tower and to generate brine water that is directed to the evaporation pond. An amount of water into and out of the cooling water ZLD system is approximately balanced.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
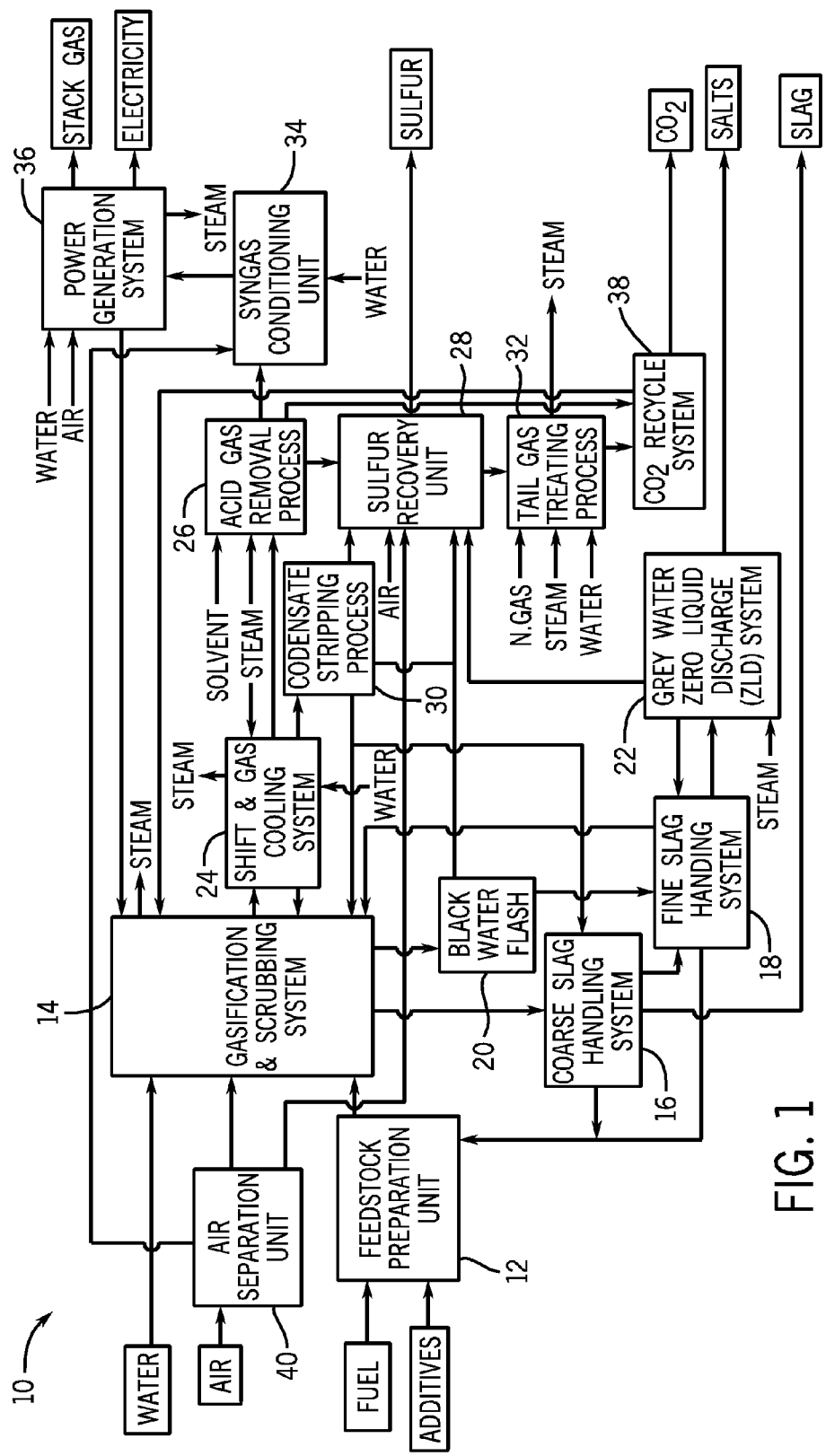
FIG. 1 is a schematic block diagram of an embodiment of an integrated gasification combined cycle (IGCC) system.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure is directed to techniques and systems for utilizing process water and wastewater techniques for creating multiple zero liquid discharge (ZLD) systems, which collectively form a total zero discharge (TZD) system of wastewater for an entire plant or facility. In particular, in certain embodiments, an IGCC plant may include both a grey water ZLD system and a cooling water ZLD system. The grey water ZLD system may be configured to receive grey water from a gasification process of the IGCC plant and to convert a portion of the grey water into a first stream of distillate, which may be directed into the gasification process of the IGCC plant. Conversely, the cooling water ZLD system may be configured to receive cooling tower blowdown (e.g., water that is discharged from the cooling tower to prevent the water from becoming saturated with salts, etc.) and to convert the cooling tower blowdown into a second stream of distillate, which may be directed into the cooling water system. The water balances (e.g., the amount of water in versus the amount of water out) of both the grey water ZLD system and the cooling water ZLD system will be approximately in balance. Moreover, the total plant discharge of water is approximately zero. Also, in certain embodiments, a brine evaporation pond may be used to replace the thermal evaporation system (e.g., brine water ZLD system) of the cooling water ZLD system. In this case, no second stream of distillate is produced.

In certain embodiments, the grey water ZLD system may include a softening pre-treatment process for removing scale-forming compounds (e.g., calcium and silica) upstream of an ammonia stripping process. In addition, in certain embodiments, the cooling water ZLD system may include a softening clarifier, one or more filters, an ultra-filtration process, and a reverse osmosis process, through which the cooling tower blowdown may be processed. In certain embodiments, the first and second streams of distillate may remain separate from steam condensate, which may be circulated to and from the cooling tower and the gasification process of the IGCC plant. Also, in certain embodiments, a heat exchanger may be used to cool the first and second streams of distillate before the first and second streams of distillate are directed into the cooling tower.

Cooling water consumption of IGCC plants is significant whenever evaporative cooling is used. In addition, the discharge of water streams is an issue of increasing importance in arid portions of the western United States, among other places, as well as locations where stringent water discharge limitations exist. Water consumption may be reduced through the use of the ZLD systems disclosed herein, which may minimize the operational impacts of the constraints mentioned above. More specifically, the disclosed embodiments represent unique integrations of technologies and water stream routing to achieve a hydraulically balanced system, in other words, a TZD system of wastewater for the entire IGCC plant. In particular, the disclosed embodiments minimize water usage, provide energy savings, reduce or even eliminate the need for permit application problems, and so forth, through a combination of water-balanced sub-systems (e.g., the grey water ZLD system and the cooling water ZLD system), which incorporate specific equipment, water routing, and heat integration methods.

FIG. 1 illustrates an IGCC system 10 that may be powered by synthetic gas, e.g., syngas. Elements of the IGCC system 10 may include a feedstock preparation unit 12. The feedstock preparation unit 12 may receive a fuel source and additives, which may be used as a source of energy for the IGCC system 10. The fuel source may include coal, petroleum coke, biomass, wood-based materials, agricultural wastes, tars, coke oven gas and asphalt, or other carbon-containing items. The feedstock preparation unit 12 may, for example, resize or reshape the fuel source by chopping, milling, shredding, pulverizing, briquetting, or pelletizing the fuel source to generate feedstock. Additionally, the additives (e.g., water or other suitable liquids) may be added to the fuel source in the feedstock preparation unit 12 to create slurry feedstock. In other embodiments, no liquid is added to the fuel source, thus yielding dry feedstock.

The feedstock may then be passed to a gasification and scrubbing system 14 from the feedstock preparation unit 12. A gasifier of the gasification and scrubbing system 14 may convert the feedstock into a combination of carbon monoxide and hydrogen, e.g., syngas. This conversion may be accomplished by subjecting the feedstock to a controlled amount of steam and oxygen at elevated pressures (e.g. from approximately 290 psia to 1230 psia) and temperatures (e.g., approximately 1300° F.-2900° F.), depending on the type of gasifier utilized.

A combustion process occurs in the gasifier of the gasification and scrubbing system 14. The combustion may include introducing oxygen to the char and residue gases. The char and residue gases may react with the oxygen to form carbon dioxide and carbon monoxide, which provides heat for the subsequent gasification reactions. The temperatures during the combustion process may range from approximately 1300° F. to 2900° F. Next, steam may be introduced into the gasifier during a gasification step. The char may react with the carbon dioxide and steam to produce carbon monoxide and hydrogen at temperatures ranging from approximately 1500° F. to 2000° F. In essence, the gasifier utilizes steam and oxygen to allow some of the feedstock to be "burned" to produce carbon monoxide and energy, which drives a second reaction that converts further feedstock to hydrogen and additional carbon dioxide. In this way, a resultant gas is manufactured by the gasifier. This resultant syngas may include approximately 85% of carbon monoxide and hydrogen, as well as $CH_4$, $CO_2$, $H_2O$, HCl, HF, COS, $NH_3$, HCN, and $H_2S$ (based on the sulfur content of the feedstock).

The gasifier of the gasification and scrubbing system 14 may also generate waste, such as slag, which may be a wet ash material. This slag may be removed from the gasifier and disposed of, for example, as road base or as another building material. In particular, in certain embodiments, the slag may first be sent to a coarse slag handling system 16 and then to a fine slag handling system 18. Coarse slag removed from the coarse slag handling system 16 may be disposed, while fine slag removed from the coarse slag handling system 16 may be sent to the fine slag handling system 18. In addition, black water from the gasifier may be sent to the fine slag handling system 18 via a black water flash system 20. As such, the fine slag may be mixed with the black water for further processing in the fine slag handling system 18. The process water removed from the coarse slag handling system 16 may be sent back to the feedstock preparation unit 12 for further use in the gasification process. Similarly, fine slag containing high carbon content and grey water, which is removed from the fine slag handling system 18, may be sent back into the feedstock preparation unit 12 and the gasification and scrubbing system 14 for further use in the gasification process, whereas a portion of grey water from the fine slag handling system 18 may be directed to a grey water zero liquid discharge (ZLD) system 22, described in greater detail below. In general, the grey water ZLD system 22 may process the grey water in such a manner that the amount of water into the grey water ZLD system 22 approximately equals the amount of water out of the grey water ZLD system 22.

From the gasification and scrubbing system 14, the syngas may be directed to a shift and gas cooling system 24. The shift and gas cooling system 24 may perform a water gas shift (WGS) reaction in which carbon monoxide reacts with water (e.g. steam) to form carbon dioxide and hydrogen. This process may adjust the ratio of hydrogen to carbon monoxide in the raw syngas from approximately 1 to 1 to approximately 3 to 1. Additionally, the shift and gas cooling system 24 may include a bypass that may be utilized to aid in proper control of the hydrogen to carbon monoxide ratio of the raw shifted syngas. It should be noted that the WGS reaction may be a sour WGS reaction, that is, sulfur may be present in the raw syngas during the WGS reaction. In addition, the shift and gas cooling system 24 may cool the syngas using suitable heat exchangers.

The cooled syngas from the shift and gas cooling system 24 may be cleaned to remove HCl, HF, COS, HCN, and $H_2S$ from the cooled syngas. For example, $H_2S$ may be removed from the cooled syngas in an acid gas removal (AGR) process 26. Elemental sulfur may be recovered from the $H_2S$ by a sulfur recovery unit 28. In addition, in certain embodiments, a condensate stripping process 30 may also be used to remove ammonia from the syngas condensate, with the ammonia being directed to the sulfur recovery unit 28 as a fuel source. The stripped syngas condensate is reused in the gasification and scrubbing system 14. Furthermore, in certain embodiments, a tail gas treating process 32 may be utilized to remove residual gas components, such as ammonia, methanol, or any residual chemicals from the sulfur recovery unit 28. Finally, syngas from the AGR process 26 may be directed to a syngas conditioning unit 34, for final processing before being sent to a power generation system 36.

In addition, in certain embodiments, a carbon dioxide ($CO_2$) recycle system 38 may remove and process the carbonous gas (e.g., $CO_2$ that is approximately 80-100 percent pure by volume) contained in the syngas. The carbon dioxide ($CO_2$) recycle system 38 also may include a compressor, a purifier, a pipeline that supplies $CO_2$ for sequestration or enhanced oil recovery, a $CO_2$ storage tank, or any combination thereof. A small fraction of its carbon dioxide, which has undergone the removal of its sulfur-containing components, may then be transmitted back to the gasification and scrubbing system 14.

The IGCC system 10 may further include an air separation unit (ASU) 40. The ASU 40 may operate to separate air into component gases by, for example, distillation techniques. The ASU 40 may separate oxygen from the air supplied to it from an associated ASU compressor, and the ASU 40 may transfer the separated oxygen to the gasifier of the gasification and scrubbing system 14. In addition, a portion of the separated oxygen and nitrogen from the ASU 40 may be directed to the sulfur recovery unit 28 and the syngas conditioning unit 34 for use in their respective processing.

In certain embodiments, the power generation system 36 may include a gas turbine engine, having a turbine, a combustor, a compressor, and a drive shaft. As described above, the combustor may receive the syngas, which may be injected under pressure from fuel nozzles. The syngas may be mixed with compressed air as well as compressed nitrogen from the DGAN compressor, and combusted within the combustor. This combustion may create hot pressurized combustion gases. The combustor may direct the combustion gases towards an inlet of the turbine. As the combustion gases from the combustor pass through the turbine, the combustion gases may force turbine blades in the turbine to rotate the common drive shaft along an axis of the gas turbine engine.

The common drive shaft may connect the turbine to the compressor to form a rotor. The compressor may include blades coupled to the common drive shaft. Thus, rotation of turbine blades in the turbine causes the common drive shaft connecting the turbine to the compressor to rotate blades within the compressor. This rotation of blades in the compressor may cause the compressor to compress air received via an air intake in the compressor. The compressed air may then be fed to the combustor and mixed with the syngas and compressed nitrogen to allow for higher efficiency combustion. The common drive shaft may also be connected to a load, which may be a stationary load, such as an electrical generator for producing electrical power. Indeed, the load may be any suitable device that is powered by the rotational output of the gas turbine engine.

The power generation system 36 also may include a steam turbine engine. The steam turbine engine may also drive a load. The load may also be an electrical generator for generating electrical power. However, the loads driven by the gas turbine engine and the steam turbine engine may be other types of loads capable of being driven by the gas turbine engine and steam turbine engine, respectively. In addition, although the gas turbine engine and steam turbine engine may drive separate loads, the gas turbine engine and steam turbine engine may also be utilized in tandem to drive a single load via a single shaft. The specific configuration of the steam turbine engine, as well as the gas turbine engine, may be implementation-specific and may include any combination of sections.

The power generation system 36 may also include a heat recovery steam generation (HRSG) system. Heated exhaust gas from the gas turbine engine may be transported into the HRSG and used to heat water and produce steam used for example to power the steam turbine engine. Exhaust from, for example, a low-pressure section of the steam turbine engine may be directed into a condenser. The condenser may utilize a cooling tower, as described in greater detail below, to exchange heated water for cooled water. The cooling tower may provide cool water to the condenser to aid in condensing the steam transmitted to the condenser from the steam turbine engine. Condensate from the condenser may, in turn, be directed into the HRSG. Again, exhaust from the gas turbine engine may also be directed into the HRSG to heat the water from the condenser and produce steam.

In combined cycle systems such as the power generation system 36, hot exhaust may flow from the gas turbine engine and pass to the HRSG, where it may be used to generate high-pressure, high-temperature steam. The steam produced by the HRSG may then be passed through the steam turbine engine for power generation. In addition, the produced steam may also be supplied to any other processes where steam may be used, such as to the gasifier of the gasification and scrubbing system 14. The gas turbine engine generation cycle is often referred to as the "topping cycle," whereas the steam turbine engine generation cycle is often referred to as the "bottoming cycle." By combining these two cycles, the power generation system 36 may lead to greater efficiencies in both cycles. In particular, exhaust heat from the topping cycle may be captured and used to generate steam for use in the bottoming cycle.

Figure 2:
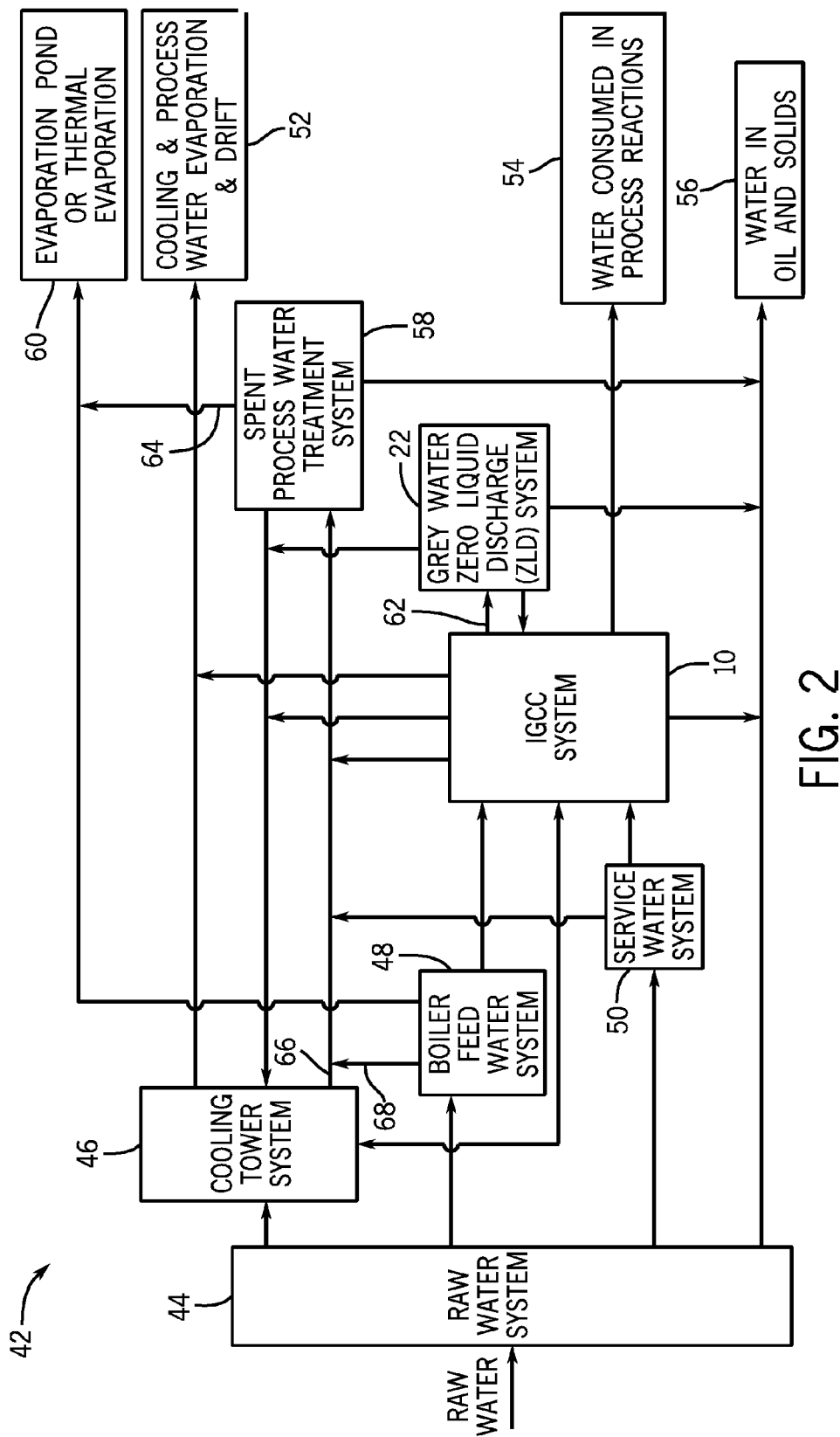
FIG. 2 is a schematic block diagram of an embodiment of a process water system related to the IGCC system of FIG. 1.

FIG. 2 is a schematic block diagram of an embodiment of a process water system 42 related to the IGCC system 10 of FIG. 1. As described in greater detail below, the process water system 42 may be capable of yielding total zero discharge (TZD) of wastewater. In other words, the amount of process water into the process water system 42 may equal the amount of process water out of the process water system 42. As illustrated, raw water may enter the process water system 42 through a raw water system 44 containing a water clarifier. Clarified water from the raw water system 44 may be directed to three main water systems of the process water system 42: a cooling tower system 46 as described above with respect to FIG. 1, a boiler feed water system 48, and a service water system 50. The cooling tower system 46 generally functions as a source of cooling water for the IGCC system 10 and the process water system 42. The boiler feed water system 48 generally functions as a source of boiler feed water for the generation of steam and heated water used throughout the IGCC system 10 and the process water system 42. The service water system 50 is used to supply water for general utility use throughout the IGCC system 10 and the process water system 42.

The IGCC system 10 utilizes the majority of water from the cooling tower system 46, boiler feed water system 48, and service water system 50. The water into the IGCC system 10 may exit the IGCC system 10 in various ways. For example, some of the water may be lost from the IGCC system 10 to evaporation and drift 52, may be consumed in process reactions 54, or may be transferred into oils and solids 56. A substantial amount of the process water spent in the IGCC system 10 may either be directed back to the cooling tower system 46 or to a spent process water treatment system 58. The spent process water treatment system 58 may produce water for re-use and waste brine water, which can either be disposed in a brine evaporative pond or processed in a thermal treatment process for recovering water and a dry salt mixture for disposal. More specifically, water from the spent process water treatment system 58 may evaporate through an evaporative pond or through thermal evaporation 60. It should be noted that the gasification and scrubbing system 14 and the power generation system 36 of the IGCC system 10 share both the cooling tower system 46 and the spent process water treatment system 58, enabling enhanced process water and heat integration.

The combined spent process water contains not only coal pile runoff, but also cooling water blowdown, boiler blowdown, and so forth. Indeed, this combined spent process water flow rate into the spent process water treatment system 58 may be several times higher than that of the grey water blowdown from the gasification and scrubbing system 14 sent to the grey water ZLD system 22. Both the spent process water treatment system 58 and the grey water ZLD system 22 recover water for re-use as well as generating solid wastes.

In addition, as described above, a certain amount of process water may become grey water in the gasification and scrubbing system 14 of the IGCC system 10. This grey water may be treated in the grey water ZLD system 22 of the IGCC system 10. The grey water ZLD system 22 will generate a distillate for re-use in the cooling tower system 46 and solids (e.g., a sludge and dry salt mixture) for disposal. In addition, in certain embodiments, the distillate may be directed back to the gasification and scrubbing system 14. The grey water ZLD system 22 may include two main steps: softening pre-treatment and thermal treatment of the gasification process water. Using the softening pre-treatment steps before the thermal treatment steps increases the reliability and availability of the grey water ZLD system 22 equipment by removing scale-forming compounds (e.g., silica) and volatile odorous and noxious gases for improved solids management (e.g., ammonia and sulfide constituents). In addition, removing the scale-forming compounds before thermal treatment decreases maintenance requirements.

In addition, in certain embodiments, the grey water ZLD system 22 may include an ammonia stripping process downstream of the grey water softening pre-treatment and upstream of the grey water thermal treatment. The ammonia salts in the grey water are generally more corrosive than sodium salts in the grey water. Therefore, the disclosed embodiments remove ammonia salts as soon as possible in the process. Doing so may reduce equipment costs, since the equipment downstream of the ammonia stripping process may be designed for less corrosive use, as opposed to highly corrosive use. The stripped ammonia may be used as a fuel in a sulfur recovery furnace of the sulfur recovery unit 28, may be used as partial makeup for fertilizer (e.g., ammonia sulfate) production, or may be destroyed in a flare system.

As such, the IGCC system 10 generates two main wastewater streams. One main wastewater stream is the gasification grey water blowdown 62 from the gasification and scrubbing system 14 of the IGCC system 10, which may require significant treatment. The other main wastewater stream is the spent process water 64 that results from gas condensation or from steam usage in the IGCC system 10, which may require only some treatment. In addition, the process water system 42 generates additional water discharge streams from cooling tower blowdown 66 from the cooling tower system 46, boiler blowdown 68 from the boiler feed water system 48, and water from various purification systems, described in greater detail below. Therefore, the treatment of these streams, in addition to heat integration associated with such treatment, as well as minimization of evaporated or discharged water, may impact the overall output and efficiency of the IGCC system 10 and the process water system 42.

The embodiments disclosed herein apply process water and wastewater technologies for efficient heat integration and re-utilization of water to create a TZD system for wastewater. The disclosed embodiments may be extremely beneficial for plants that have limited water supply, and may be environmentally friendly, with very little impact on capital expenses, operating expenses, output, and efficiency of the plant. In addition, the disclosed embodiments may reduce or even eliminate the tedious and lengthy permit application process required for compliance with process water discharge permitting.

Figure 3:
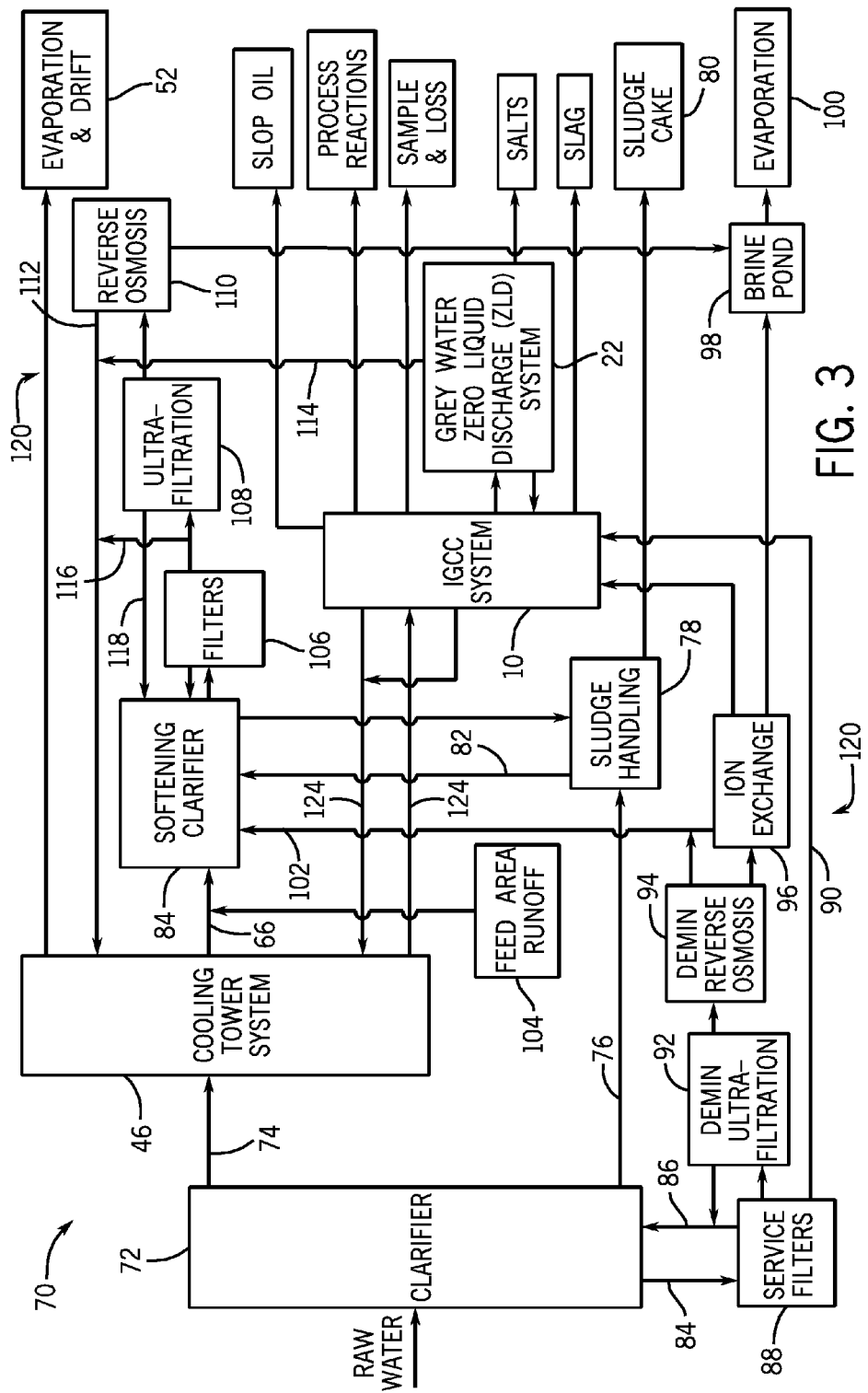
FIG. 3 is a schematic block diagram of an embodiment of an IGCC plant, incorporating process water and wastewater techniques that create a total zero discharge (TZD) system of wastewater.

More specifically, FIG. 3 is a schematic block diagram of an embodiment of an IGCC plant 70, incorporating process water and wastewater techniques that create a TZD system for wastewater. The IGCC plant 70 illustrated in FIG. 3 generally incorporates the IGCC system 10 and the process water system 42 of FIGS. 1 and 2. As illustrated, raw water may enter a clarifier 72, which may remove sludge from the raw water. The relatively clear water 74 from the clarifier 72 may be directed into the cooling tower 46, as described above with respect to FIG. 2. The sludge 76 from the clarifier 72 may be directed to a sludge handling process 78, which may produce sludge cake 80 from the sludge for disposal, and may direct the resulting water 82 into a softening clarifier 84, as described below.

The clarified water from the clarifier 72 may be filtered through one or more service filters 88, with a certain amount of the filtered water 90 from the service filters 88 being directed to the IGCC system 10 as service water 90. A stream 86 containing spent filter backwash water from the service filters 88 and the reject from a demineralization ultra-filtration process 92 may be returned back to the clarifier 72 for solids removal. However, some of the water from the service filters 88 may be directed into the demineralization ultra-filtration process 92, a demineralization reverse osmosis process 94, and an ion exchange process 96, where salts may be removed from the filtered water and directed to a brine pond 98 (e.g., a thermal evaporation system), where the water may be lost to evaporation 100. The use of the brine pond 98 may enable high strength ion exchange regenerant waste. The stream 102 containing ion exchanger rinse from the ion exchange process 96 and reject from the demineralization reverse osmosis process 94 may be directed to the softening clarifier 84, as opposed to the cooling tower system 46, to avoid decreased operating cycles of the cooling tower system 46. It should be noted that the softening clarifier 84 may also receive water from feed area runoff 104 of the IGCC plant 70.

The softening clarifier 84, in conjunction with associated downstream filters 106 (e.g., multi-media filters) may be used to remove aluminum, fluoride, calcium and magnesium hardness, silica, and other scaling compounds from the cooling tower blowdown 66. Downstream of the softening clarifier 84 and the filters 106 may be an ultra-filtration process 108 and a reverse osmosis process 110 for removing any remaining salts, which may be directed to the brine pond 98. The use of cooling tower blowdown softening and filtering via the softening clarifier 84 and the filters 106 upstream of the ultra-filtration process 108 and the reverse osmosis process 110 helps protect membrane integrity and efficiency of the ultra-filtration process 108 and the reverse osmosis process 110.

All of the permeate 112 from the reverse osmosis process 110 is returned entirely to the cooling tower system 46. In other words, the permeate 112 from the reverse osmosis process 110 is only returned to the cooling tower system 46. In certain embodiments, the permeate 112 from the reverse osmosis process 110 is combined with distillate 114 from the grey water ZLD system 22.

In addition, in certain embodiments, a portion of filtered cooling water 116 of the softened and filtered cooling tower blowdown downstream of the softening clarifier 84 and the filters 106 may be returned back to the cooling tower system 46, with the remaining filtered cooling water processed through the ultra-filtration process 108 and the reverse osmosis process 110. This enables the ultra-filtration process 108 and the reverse osmosis process 110 equipment sizes to be minimized. In certain embodiments, the reject 118 from the ultra-filtration process 108 may be directly returned to the softening clarifier 84 to remove suspended solids. In addition, the permeate 112 from the reverse osmosis process 110 may be routed to a sump of the cooling tower system 46 as low total dissolved solids (TDS) make-up water for cooling tower evaporation 52. Evaporation and drift 52 from the cooling tower system 46 is the main source of water loss of the IGCC plant 70. Therefore, using the make-up water from the reverse osmosis process 110 may help offset some of these losses.

The brine pond 98 may be replaced by a brine water ZLD system 120. Similar to the grey water ZLD system 22, the brine water ZLD system 120 may enable zero liquid discharge (ZLD) of the cooling water system. In conjunction with the grey water ZLD system 22, the brine water ZLD system 120 may enable the TZD characteristics of the IGCC plant 70. In other words, the grey water ZLD system 22 and the brine water ZLD system 120, in addition to being individual ZLD systems, may lead to the entire IGCC plant 70 having total zero discharge of wastewater.

In addition, the combination of flow paths of the brine water ZLD system 120 enables the IGCC plant 70 to handle the cooling tower concentration effects of cycled raw water that is of poor quality (e.g., high hardness and/or silica levels), thereby enabling increased operating cycles of the cooling tower system 46. In addition, interruptions of base load cooling capacity (e.g., for the gasifier of the gasification and scrubbing system 14, the power generation system 36, and the ASU 40) may be reduced or even eliminated. Furthermore, maintenance (e.g., of the process piping, cooling loops, and other associated equipment) for scale removal or increased chemical consumption for dispersants or scale inhibitors may also be reduced or even eliminated. Moreover, routing of the distillate 114 from the grey water ZLD system 22 to the cooling tower system 46 downstream of the reverse osmosis process 110 may enable mixing with the permeate 112 from the reverse osmosis process 110, which is routed to the cooling tower system 46.

The disclosed embodiments will lead to a reduction in the raw water consumption and treatment chemical usage of the IGCC plant 70 through the particular routings of the permeate 112 and distillate 114. In particular, a portion of the distillate may be returned to the gasification and scrubbing system 14 for re-use, such as in instrument flushes, clean purge water, solids slurry preparation, lock hopper flush drum makeup, quench water or spray, and so forth. In addition, heat integration recovery within the gasification and scrubbing system 14 may be enabled where applicable. The disclosed embodiments also keep both the distillate 114 from the grey water ZLD system 22 and the permeate 112 from the cooling water reverse osmosis process 110 separate from the steam system condensate 124 from the IGCC system 10 (e.g., through the spent process water treatment system 58 of FIG. 2), which may be circulated to and from the cooling tower system 46 separately. This may avoid condensate chemistry problems and high-pressure steam system contamination.

The use of the two ZLD systems (e.g., the grey water ZLD system 22 and the brine water ZLD system 120) to create the TZD system of the IGCC plant 70 may require unique integration of internal water streams to be in balance. For example, the disclosed embodiments may include calculation of cooling water loads for multiple operating conditions, which may include hot days, cold days, differing fuel envelope characteristics (e.g., high-sulfur, high-ash, high-moisture, and so forth) that may affect process water blowdown rates, and makeup water quality and availability that may define hydraulic limitations, bottlenecks, and peak demand and turndown water balances (e.g., from single or multiple gasifier train operation and sub-system sequencing or emergency shutdown operations). The disclosed embodiments may also include calculation of water stream routing, ionic salt balances, and estimates of flash cooling temperatures to limit corrosion, to allow the use of pre-treatment membrane processes, and to size equipment. The disclosed embodiments may further use various cross heat exchangers to allow maximum heat recovery for system efficiency.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
a gasification system with an output of grey water;
a cooling tower system configured to receive raw water and to supply the gasification system with process water;
a grey water zero liquid discharge (ZLD) system configured to receive the grey water from the gasification system, to generate a first stream of distillate, and to direct the first stream of distillate to the gasification system; and
a cooling water ZLD system configured to receive cooling tower blowdown from the cooling tower system, to generate a second stream of distillate, and to direct the second stream of distillate to the cooling tower system.

2. The system of claim 1, wherein water streams into and out of the grey water ZLD system are approximately equal, and wherein water streams into and out of and the cooling water ZLD system are approximately equal.

3. The system of claim 1, wherein the first and second streams of distillate are combined upstream of the cooling tower system.

4. The system of claim 1, wherein the grey water ZLD system comprises a softening pre-treatment system configured to remove scale-forming compounds from the grey water.

5. The system of claim 4, wherein the grey water ZLD system comprises an ammonia stripping system downstream of the softening pre-treatment system.

6. The system of claim 1, wherein steam condensate is circulated to and from the cooling tower system and the gasification system separate from the first and second streams of distillate.

7. The system of claim 1, wherein the cooling water ZLD system comprises a softening clarifier, one or more filters, an ultra-filtration system, a reverse osmosis system, and a thermal evaporation system configured to process the cooling tower blowdown.

8. The system of claim 7, wherein brine water from the reverse osmosis system is directed to the thermal evaporation system.

9. The system of claim 7, wherein a stream of permeate is directed from the reverse osmosis system only to the cooling tower system.

10. The system of claim 1, wherein a gasification process plant for chemical production comprises the gasification system.

11. The system of claim 1, wherein an integrated gasification combined cycle system power plant comprises the gasification system.

12. A system, comprising:
- a gasification system configured to output grey water;
- a cooling tower system configured to receive raw water and to supply the gasification system with process water;
- a grey water zero liquid discharge (ZLD) system configured to receive the grey water and to generate a first stream of distillate, wherein the grey water ZLD system comprises an ammonia stripping system, and an amount of water into and out of the grey water ZLD system is approximately equal; and
- a cooling water ZLD system configured to receive cooling tower blowdown from the cooling tower system, to generate a second stream of distillate, and to direct the second stream of distillate to the cooling tower system.

13. The system of claim 12, wherein the grey water ZLD system comprises a softening pre-treatment system configured to remove scaling compounds from the grey water upstream of the ammonia stripping system.

14. The system of claim 12, wherein the first stream of distillate from the grey water ZLD system is combined with the second stream of distillate from the cooling water ZLD system.

15. The system of claim 14, wherein the first stream of distillate from the grey water ZLD system is combined with a permeate stream from a reverse osmosis system of the cooling water ZLD system.

16. The system of claim 15, wherein the combined stream of the first stream of distillate and the permeate stream is directed to the cooling water ZLD system.

17. The system of claim 14, wherein the first and second streams of distillate are directed into either the gasification system or the cooling tower system.

18. A system, comprising:
- a gasification system configured to output grey water;
- a cooling tower configured to receive raw water and to supply the gasification system with process water;
- a cooling water zero liquid discharge (ZLD) system having an evaporation pond, wherein the cooling water ZLD system is configured to receive cooling tower blowdown from the cooling tower and to generate brine water that is directed to the evaporation pond, and wherein an amount of water into and out of the cooling water ZLD system is approximately balanced; and
- a grey water ZLD system configured to receive the grey water and to generate distillate, wherein the grey water ZLD system comprises an ammonia stripping system, and an amount of water into and out of the grey water ZLD system is approximately balanced.

19. The system of claim 18, wherein total wastewater discharge of the system is approximately zero.

* * * * *